Sept. 3, 1968 E. A. NEWMAN 3,400,216

SPEECH RECOGNITION APPARATUS

Filed Feb. 1, 1965 6 Sheets-Sheet 1

Sept. 3, 1968 E. A. NEWMAN 3,400,216

SPEECH RECOGNITION APPARATUS

Filed Feb. 1, 1965 6 Sheets-Sheet 3

SPEECH RECOGNITION APPARATUS

Filed Feb. 1, 1965 6 Sheets-Sheet 4

Sept. 3, 1968 E. A. NEWMAN 3,400,216

SPEECH RECOGNITION APPARATUS

Filed Feb. 1, 1965 6 Sheets-Sheet 5

Sept. 3, 1968 E. A. NEWMAN 3,400,216

SPEECH RECOGNITION APPARATUS

Filed Feb. 1, 1965 6 Sheets-Sheet 6

United States Patent Office 3,400,216

Patented Sept. 3, 1968

3,400,216

SPEECH RECOGNITION APPARATUS

Edward Arthur Newman, Teddington, England, assignor to National Research Development Corporation, London, England, a British company Filed Feb. 1, 1965, Ser. No. 429,500
Claims priority, application Great Britain, Jan. 31, 1964, 4,266/64
18 Claims. (Cl. 179—1)

ABSTRACT OF THE DISCLOSURE

A speech recognition system uses correlation techniques and delay lines to translate a speech waveform into visible information characteristic of the waveform. The output from the correlation network is independent of the input speech waveform amplitude. Logic circuits are used to effect the final translation into visible information.

This invention relates to the problem of effecting speech recognition by means of machines and is particularly, although by no means exclusively, concerned with arrangements for distinguishing between spoken numerals by using discriminating techniques which are capable of discriminating between all the vowel sounds and most of the consonant sounds in a novel manner.

Vowel sounds are continuous sounds and any vowel sound generally consists of three or four notes together with their harmonics. Of these characteristic notes or formants the note of highest frequency carries relatively little speech information and the majority of such information is carried on the middle of three or two middle of four notes. The resonant cavities of the mouth and throat are driven by a series of low frequency sharp-edge pulses which are emitted by the larynx, and this causes the lowest note. These pulses at the low drive frequency themselves carry little useful information about vowels but they do cause the frequencies of the two main information-carrying notes to be harmonics of the drive frequency. The vowel information frequencies lie between about 350 and 3,000 cycles/sec. and since in most dialects about nine different frequencies may be present within this range the ratio of one frequency to the next is usually of the order of 1.3 to 1. This means that variations in any frequency emitted can vary safely by as much as $\pm 15\%$ between one person and another and still be recognisable. If, however, due to marked regional differences, this figure is exceeded, modifications may have to be made in the procedural detail to achieve accurate recognition.

Vowel sounds occur roughly in pairs. The members of any such pair have a lower frequency formant which is substantially common to both members and one member also has substantial energy in a high frequency formant, whereas the other member does not. The common lower frequency formants for all vowel pairs lie below a frequency of approximately 1000 cycles per second, and this fact is of importance in the discrimination of sounds, as will become apparent later.

Consonants only occur when a sound is started or stopped, or when the mouth is shaped to produce a hiss. If the tongue is placed near the back of the mouth and the nose is open, an almost pure larynx frequency sound is emitted corresponding to the letter "n." If the mouth is closed and the nose remains open, a slightly adulterated larynx frequency sound is produced correspondingly to the letter "m." However, consonants such as "p," "t," "b," "d" produce sounds of a special kind which resemble vowel sounds. These special sounds have two characteristics; firstly, they are rapidly varying with respect to time, and secondly, they only carry energy in the upper, or higher frequency note, of the two main information-carrying notes. They can therefore be treated as vowels for the purposes of recognition as effected according to the present invention. Other consonants, such as "s," "th," "f," which are all hissing sounds, produce "noise" which is concentrated largely in one or two parts of the frequency spectrum and are thus referred to as sounds of narrow band-width. The problem of searching for certain characteristic vowel notes or vowel formants is two-fold. In the first place the vowel formants vary considerably according to the individual, and in the second place the volume of sound in any particular vowel formant can vary considerably with respect to time.

Various methods have previously been proposed for separating two vowel notes or formants. In a first method, two sharply tuned filters are used, one centred on the main frequency of each formant, but this arrangement only works satisfactorily for one person at a time as the particular centering frequencies vary with the individual. Alternatively, two broad band filters can be used, again centred on the main vowel frequencies and having a substantial degree of overlap between them, but this arrangement is unable to make allowance for any change in the volume of the vowel sounds. A further known method uses a differential filter system to produce a positive or negative signal corresponding to the difference in response to the two vowel sounds in two separate filters. However, such a difference signal must be obtained for every pair combination of filters and if there are, for example, nine filters, as would be required for most dialects, an extremely complex arrangement is necessary.

It is an object of the present invention to overcome the drawbacks of these known methods and to provide speech recognition apparatus which overcomes the above-mentioned problems of complexity and unsuitability for general use by any individual.

It is a further object of this invention to use auto-correlation techniques for obtaining difference signals from a speech input waveform and to translate such signals into visible information by means of a decision network.

It is another object of the present invention to provide two delay line systems for the input speech waveform, one for frequencies above a predetermined value and the other for frequencies below this value, with some degree of overlap between the two systems if desired.

It is yet another object of the invention to provide means for obtaining an output from the correlating networks which is independent of the amplitude of the input speech waveform.

Speech recognition apparatus in accordance with the present invention comprises speech signal input terminals for receiving a speech input waveform, at least one delay network arranged for connection to said speech signal input terminals, such delay network or each delay network having a plurality of correlators associated therewith for correlating the input signal to the delay network with delayed output signals taken from successive points of said delay network, means for decoding the outputs from each of said correlators, and a decision network for indicating the characteristics of the speech input waveform from the decoded information.

In order that the invention may be more readily understood, various embodiments thereof will now be described in detail by way of example only and with reference to the accompanying drawings, in which:

FIG. 1(*b*) is an auto-correlation diagram for the points *a* and *b* on the waveform;

FIG. 1(*c*) is an auto-correlation diagram for the points *b* and *d* on the waveform;

FIG. 1(*d*) is an auto-correlation diagram for the points *c* and *d* on the waveform;

FIG. 1(*e*) is a diagram of a speech waveform;

Figure 1A:
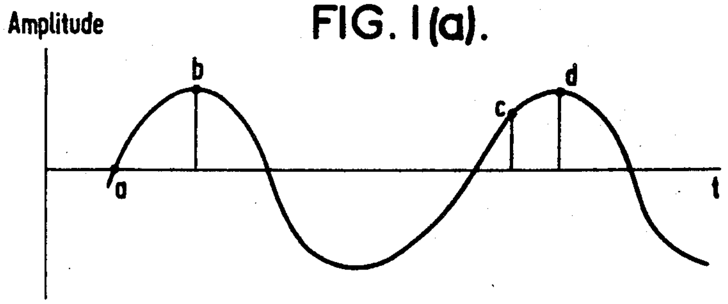
FIG. 1(*a*) is a diagram of a sinusoidal waveform.
Figure 1B:
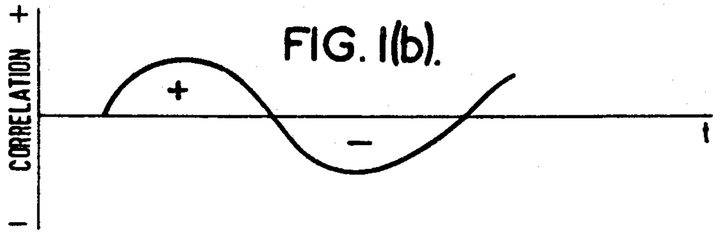
Figure 1C:
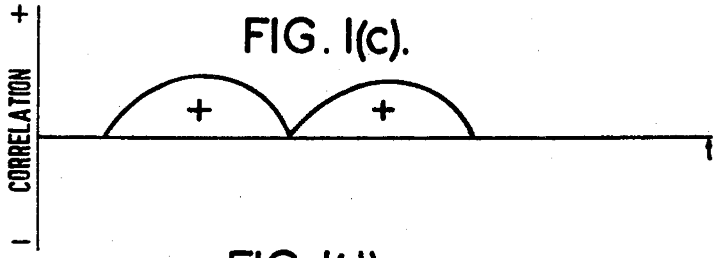
Figure 1D:
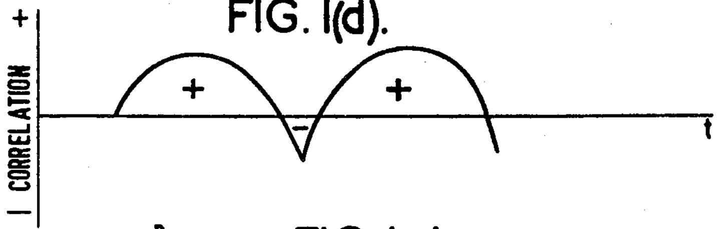
Figure 1E:
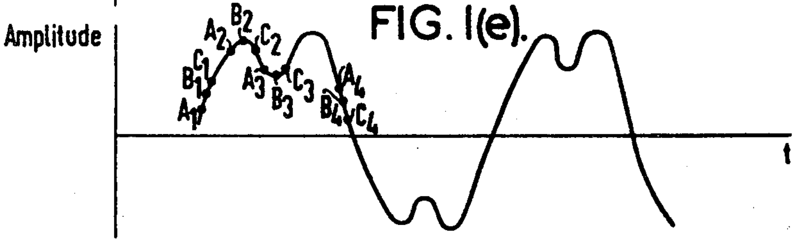

As is well-known, the auto-correlation function of a wave is obtained by matching the wave with a delayed replica thereof, the degree of matching between the two waves giving a measure of the auto-correlation between them. Thus, the auto-correlation function of a wave for any given value of delay $\tau$ may be obtained by multiplying the delayed and undelayed waves and integrating the product.

For example, if the delay between two particular network points is $\tau$ and the frequency of the speech input signal is $f$, positive correlation is obtained for $\tau=a/f$ and negative correlation is obtained for $$\tau=\frac{2b+1}{2f}$$

where $a$ and $b$ are any integers.

In order to distinguish sharply between two signals of different frequencies $f_1$ and $f_2$, the delay is arranged such that $$\tau=\frac{2a+1}{f_1}=\frac{2a}{f_2}$$

for some $a$.

Then, $$(2a+1)f_2=2af_1, \text{ or}$$

$$f_2=\frac{2a}{2a+1}\cdot f_1$$

Also $$2a\ (f_1-f_2)=f_2$$

Or $$\tau=\frac{2a}{f_2}=\frac{1}{f_1-f_2}$$

By arranging the delay in this way, $f_2$ gives a positive correlation and $f_1$ gives a negative correlation, so that the two frequencies are distinguishable independently of their relative amplitudes.

This auto-correlation technique can be expressed in another way as shown by reference to FIGS. 1(*a*)–(*d*) of the drawings. FIG. 1(*a*) is a diagram of a simple sinusoidal waveform with wave amplitude as ordinate and with time as abscissa. Four particular points on the waveform *a*, *b*, *c*, *d*, are selected as shown. Points *b* and *d* are two adjacent positive maxima, *a* is a point of zero amplitude and *c* is a point on the positive part of the curve between zero amplitude and maximum amplitude. If, considering the waveform of FIG. 1(*a*), one multiplies the amplitude at time corresponding to point *a* by the amplitude at a later time instant, such as represented for example by points *b*, *c*, or *d*, then a correlation waveform whose amplitude varies with time will be obtained. If the time delay $\tau$ between the two points is ¼ cycle, as with points *a* and *b*, the correlation waveform of FIG. 1(*b*) will be produced whose frequency is twice that of the waveform of FIG. 1(*a*) and which alternates between positive correlation and negative correlation. If the time delay between the two correlated points is one cycle, i.e., *b* and *d*, then the waveform of FIG. 1(*c*) is obtained wherein the correlation is always positive. Finally, if the time delay is such that the two points are represented by *c* and *d*, then the correlation waveform of FIG. 1(*d*) is obtained which is positive for the most part but which also includes a small negative portion.

FIG. 1(*e*) shows part of a typical speech waveform containing crests and troughs. It will be noted that if any three adjacent points are selected such as $A_1$, $B_1$, $C_1$, etc., there are only four possible ways in which these three points can lie with respect to each other. These are, as shown in the drawing:

$$A_1<B_1<C_1$$
$$A_2<B_2>C_2$$
$$A_3>B_3<C_3$$
$$A_4>B_4>C_4$$

Therefore, if tappings are taken at these points on a delay line which is carrying a speech waveform and these tapped outputs are correlated and decoded so as to give an indication of the relative magnitudes of the three signals, it is possible to ascertain the nature of the waveform and hence determine the vowel sound which it is representative of. This technique is used in one embodiment of the invention as will be described more fully later.

The correlation function with respect to time delay waveform may take many forms. If the input frequency is a pure sine wave the correlation function varies sinusoidally with time. If however, the waveform contains harmonics of any phase, the function tends towards a square wave. If the input covers a band of frequencies the function becomes smaller with increasing delay, the narrower the band-width, the less the degree of attenuation which occurs. For speech signals which contain a number of mixed frequencies, the correlation function is quite complex, but it is highly characteristic of the majority of actual speech sounds which may be produced. In order to cover the whole of this speech frequency range, either a plurality of separate delay lines can be used, each line being associated with a restricted frequency range, or a tapered delay line having a considerable number of sections can be used.

Figure 2:
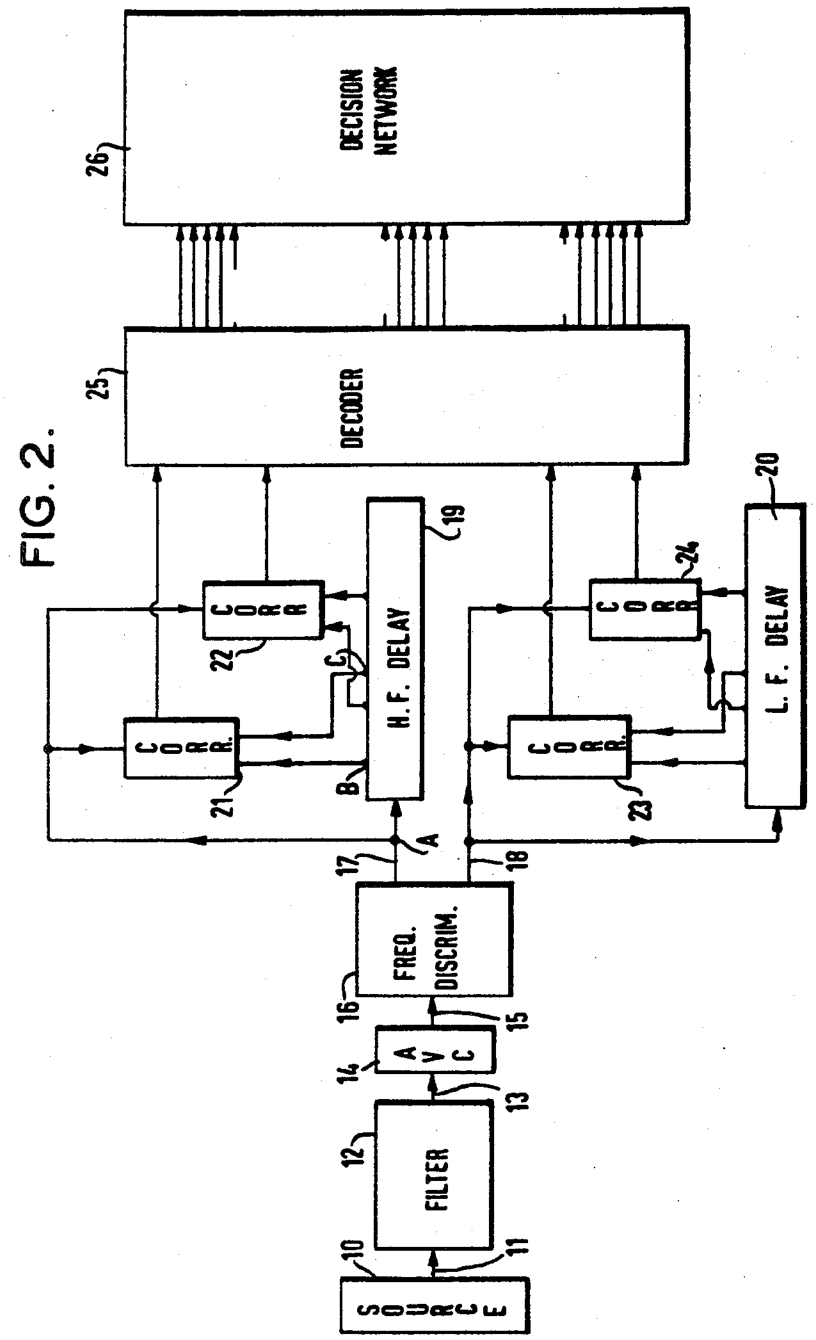
FIG. 2 is a schematic diagram of a preferred embodiment according to the invention in a simplified form: in practice, more correlators would be used.

Referring now to FIG. 2, a speech source is indicated at 10 and produces a speech input waveform for the recognition system. The speech input waveform is led over line 11 to a filter 12, and thence over line 13 to an automatic volume control 14 which will be described in greater detail later.

The filter 12 comprises a suitable non-linear frequency network. A preferred filter has a frequency response with a sharp drop in response below 150 c./s., which is linear between 150 c./s. and 700 c./s., rises sharply from 700 c./s. to 2,000 c./s., is linear again from 2000 c./s. to 4000 c./s., and has a sharp cut-off above 4000 c./s. A frequency network having such characteristics related to the voice frequency components enables greatly improved clarity of speech reproduction to be obtained.

The output from the automatic volume control 14 is then conducted over line 15 to a filter 16 which divides the input waveform into a high frequency signal on line 17 and a low frequency signal on line 18. Any suitable filter may be used and as it does not constitute part of the invention it will not be described in detail. The two signals are then fed respectively into a high-frequency delay network 19 and a low-frequency delay network 20, the high-frequency delay network 19 being for the upper of the two main information-carrying notes (3rd formant), and the low-frequency delay network 20 being for the lower information-carrying note although some degree of frequency overlap between the two delay networks may be necessary for satisfactory operation. The frequency division is arranged to be at substantially 1000 c./s. This provides better information about the lower frequency formants and it prevents "high-frequency" information interfering with low-frequency information. The delay networks may be of any suitable form, both coil-capacitor delay lines and acoustical delay lines proving satisfactory. In FIG. 2 each delay network 19, 20 has two associated correlators 21, 22 and 23, 24 respectively, but in practice many more than two correlators are used with each delay network. The actual construction and method of operation of one such correlator will be described later. Each correlator is preferably supplied with the undelayed high frequency or low frequency signal and with two differently delayed versions of the same signal from the associated delay network. It is also possible to provide each correlator with only two inputs, i.e. the undelayed signal and one delayed version of the same signal. In effect, each correlator produces either a positive or negative correlation between the original and the delayed signals. The correlators may take any one of several forms as will be explained later, but with the 3-input arrangement the points A, B, C on the delay line from which the signals are tapped are chosen such that B is delayed an amount $\tau$ with respect to A and C is delayed an amount $2\tau$ with respect to A.

The signals produced by each of these correlators 21, 22, 23, 24 are taken over suitable lines to a computer type instruction decoder 25, one suitable form of which will be described later. In practice, decoder 25 receives many more than four input signals. If the decoder 25 is provided with $p$ input signals each of which is either present or absent, then $2^p$ output lines controlled by the inputs can be produced, but with only one of these output lines carrying a signal at any given time. In the arrangement illustrated in FIG. 2 where there are four inputs to the decoder 25, sixteen output lines are needed. Each of these output lines is connected to a decision network 26 which is arranged to give an indication of the characteristics of the speech waveform and which is described more fully later.

Figure 3:
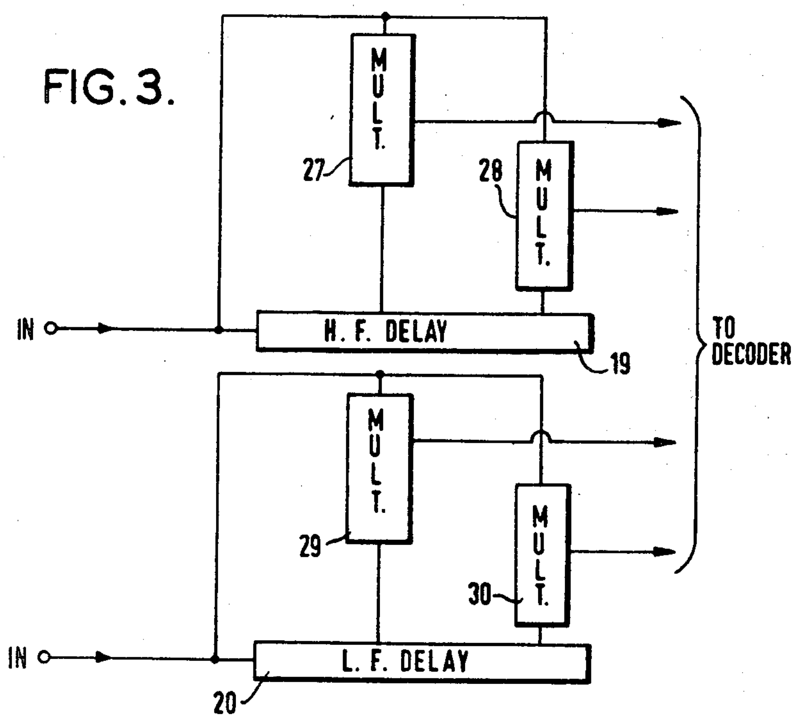
FIG. 3 is a schematic diagram of part of an alternative system using multipliers instead of the correlators of FIG. 2: again, in practice, more multipliers would be used.

FIG. 3 is a block schematic diagram showing multipliers used as correlators in the system of FIG. 2. Two multipliers 27, 28 of suitable known form are associated with the high-frequency delay network 19 and two further multipliers 29, 30 are associated with the low-frequency delay line. Alternatively, dividers can be used as correlators in the system of FIG. 2, but the expense is usually prohibitive.

One form of correlator which can easily be adapted for use with either two or three inputs is now described with reference to FIG. 4. The circuit can be used as a three input correlator with inputs at A, B and C or it can be used as a two input correlator with inputs at A and C and with B earthed. The aim of this circuit is to provide an output which is independent of input amplitude and which moreover provides a constant positive correlation output for one set of conditions and a constant negative correlation output for another set of conditions. In the two input case, where the inputs are A and C, the correlator creates two variables P and Q. P has a value of, say, +6 v., when A is positive and a value of −6 v. when A is negative. Similarly, Q has a value of, say, ±6 v., according to whether C is positive or negative. The circuit then calculates $\int PQdt$ which it provides as an output. In the three input case, the circuit calculates the value of (A–B) and (B–C), which may be called M and N. Variables P, Q have a value of, say, ±6 v. according as M and N are positive or negative. The circuit then calculates $\int PQdt$. Referring back to FIG. 1(*e*), it will be seen that there are four possible alternatives when the difference signals are created with the three input device. In the first case, $(A_1–B_1)$ and $(B_1–C_1)$ are both negative, which when multiplied gives a positive output. Secondly, $(A_2–B_2)$ is negative and $(B_2–C_2)$ is positive, which when multiplied gives a negative output. Thirdly, $(A_3–B_3)$ is positive and $(B_3–C_3)$ is negative giving a negative output, and finally $(A_4–B_4)$ and $(B_4–C_4)$ are both positive and produce a positive output. This arrangement thus provides a correlator which will produce such constant positive or negative outputs in accordance with the four possible conditions and also independent of input amplitude.

Figure 4:
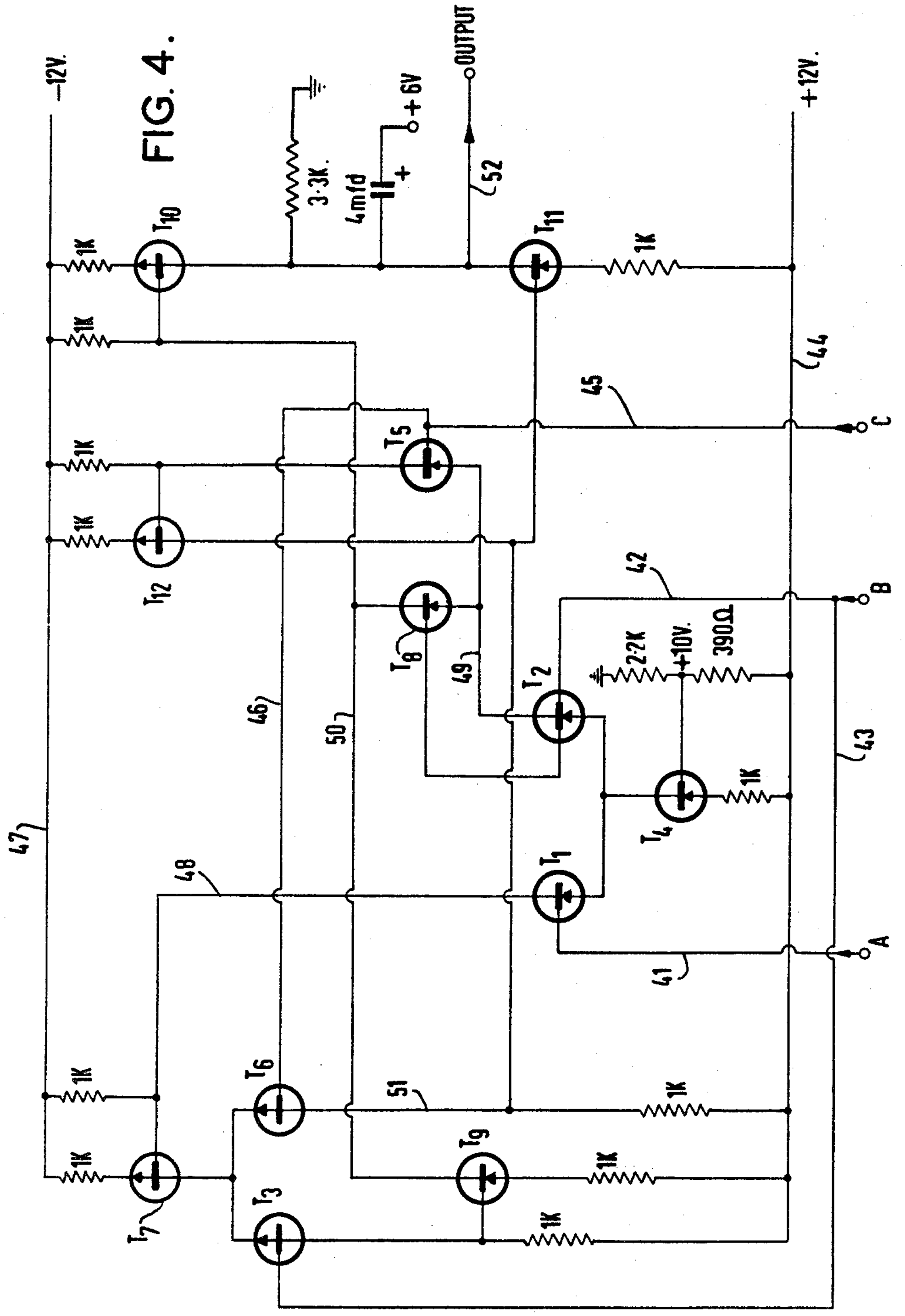
FIG. 4 is a circuit diagram of a 2- or 3-input correlator for use in the system of FIG. 2.

In FIG. 4, input A is connected over line 41 to the base of a PNP transistor $T_1$. Input B is connected over line 42 to the base of a PNP transistor $T_2$ and over line 43 to the base of an NPN transistor $T_3$. The emitters of transistors $T_1$ and $T_2$ are coupled together and to the collector of a further PNP transistor $T_4$ whose emitter is connected to the positive rail 44 and whose base is subjected to a positive bias voltage. Input C is connected over line 45 to the base of a PNP transistor $T_5$ and over line 46 to the base of an NPN transistor $T_6$ whose emitter is coupled to the emitter of transistor $T_3$. These jointly coupled emitters are connected to the collector of an NPN transistor $T_7$ whose emitter is connected to the negative rail 47 and whose base is connected to the collector of transistor $T_1$ by way of line 48. The collector of transistor $T_2$ is coupled to the emitter of transistor $T_5$ over a line 49 and a connection is taken from this line to a PNP transistor $T_8$ whose base is connected to the base of transistor $T_2$ and whose collector is joined to a line 50. Line 50 extends between the collector of a PNP transistor $T_9$ whose base is connected to the collector of transistor $T_3$, and the base of an NPN output transistor $T_{10}$ which has its emitter connected to the negative rail 47. The collector of transistor $T_6$ is connected over line 51 to the positive rail 44 and to the base of a PNP output transistor $T_{11}$ whose emitter is connected to the positive rail 44. A point on line 51 also goes to the collector of an NPN transistor $T_{12}$ whose emitter is connected to the negative rail 47 and whose base is connected to the collector of transistor $T_5$ and to the negative rail. The collectors of the two output transistors are connected together and an output is taken therefrom over lead 52. An RC integrating circuit is also connected to the coupled collectors of the two output transistors $T_{10}$ and $T_{11}$.

The method of operation for only the three input case will be considered in detail, the two input case where B is earthed then being obvious to one skilled in the art. Considering first the inputs A and B to transistors $T_1$ and $T_2$, it will be seen that for the condition where $A<B$ transistor $T_1$ will be rendered conductive and transistor $T_2$ will be held off, while for $A>B$ the reverse will be the case. Thus, for $A<B$, current will flow over lead 48 to the base of transistor $T_7$. In the same manner, inputs B and C are fed to the bases of transistors $T_3$ and $T_6$. Thus, for the condition $B>C$ current will flow through transistor $T_3$ and thus to output transistor $T_{10}$ via transistor $T_9$ and line 50, while for $B<C$ current will flow through transistor $T_6$ and over line 51 to output transistor $T_{11}$.

In a similar manner, if $A>B$ current will flow over line 49 to transistors $T_5$ and $T_8$ to which inputs C and B respectively are connected. Thus, for $B<C$, transistor $T_8$ will conduct and current will flow to output transistor $T_{10}$, while if $B>C$ current flows through transistor $T_5$ which is turned on, and thence through transistor $T_{12}$ to ouput transistor $T_{11}$.

Thus, for the conditions $A<B$, $B<C$ and $A>B$, $B>C$, output transistor $T_{11}$ is conductive, while for conditions $A<B$, $B>C$ and $A>B$, $B<C$ output transistor $T_{10}$ is conductive. Thus, the desired constant positive or negative output signal is obtained. It should be pointed out that the values of the RC integrating circuit are critical and should be capable of adjustment.

Figure 5:
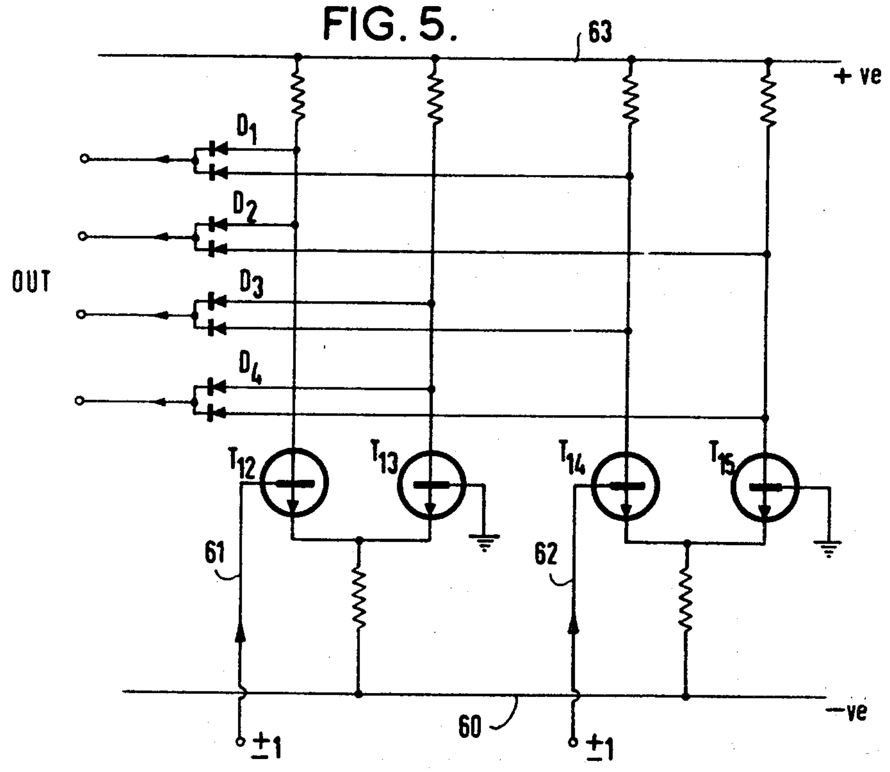
FIG. 5 is a circuit diagram of a diode decoder for use in the system of FIG. 2, the decoder being provided with only two inputs for examplary purposes only.

Reference is now made to FIG. 5 which shows a diode decoder suitable for dealing with the outputs from the correlators. A decoder with only two inputs and hence four outputs is illustrated for the sake of simplicity.

The decoder consists essentially of two long-tailed pairs of NPN transistors, $T_{12}$, $T_{13}$ and $T_{14}$, $T_{15}$, the emitters of each pair being connected together and to a negative rail 60. The inputs to each pair are in the form of a (+1, −1) signal, i.e., a signal which is of constant amplitude but which may be positive or negative. These signals are taken from the correlator outputs and are fed to the bases of transistors $T_{12}$ and $T_{14}$ over leads 61 and 62 respectively. The bases of transistors $T_{13}$ and $T_{15}$ are earthed. The collectors of each transistor are connected through resistances to the positive rail 63 and connections are taken from the collector to diode networks $D_1$, $D_2$, $D_3$, $D_4$. Each diode network consists of two coupled diodes having an input from each of two non-linked collectors and having a common output. Thus, if transistors $T_{12}$ and $T_{14}$ conduct for an input of +1 and transistors $T_{13}$ and $T_{15}$ conduct for an input of −1 then the ouputs of the diode networks $D_1$, $D_2$, $D_3$, $D_4$ will be *+ve, −ve, −ve, +ve* respectively. These outputs are connected to the decision network 26 (FIG. 2).

Figure 6:
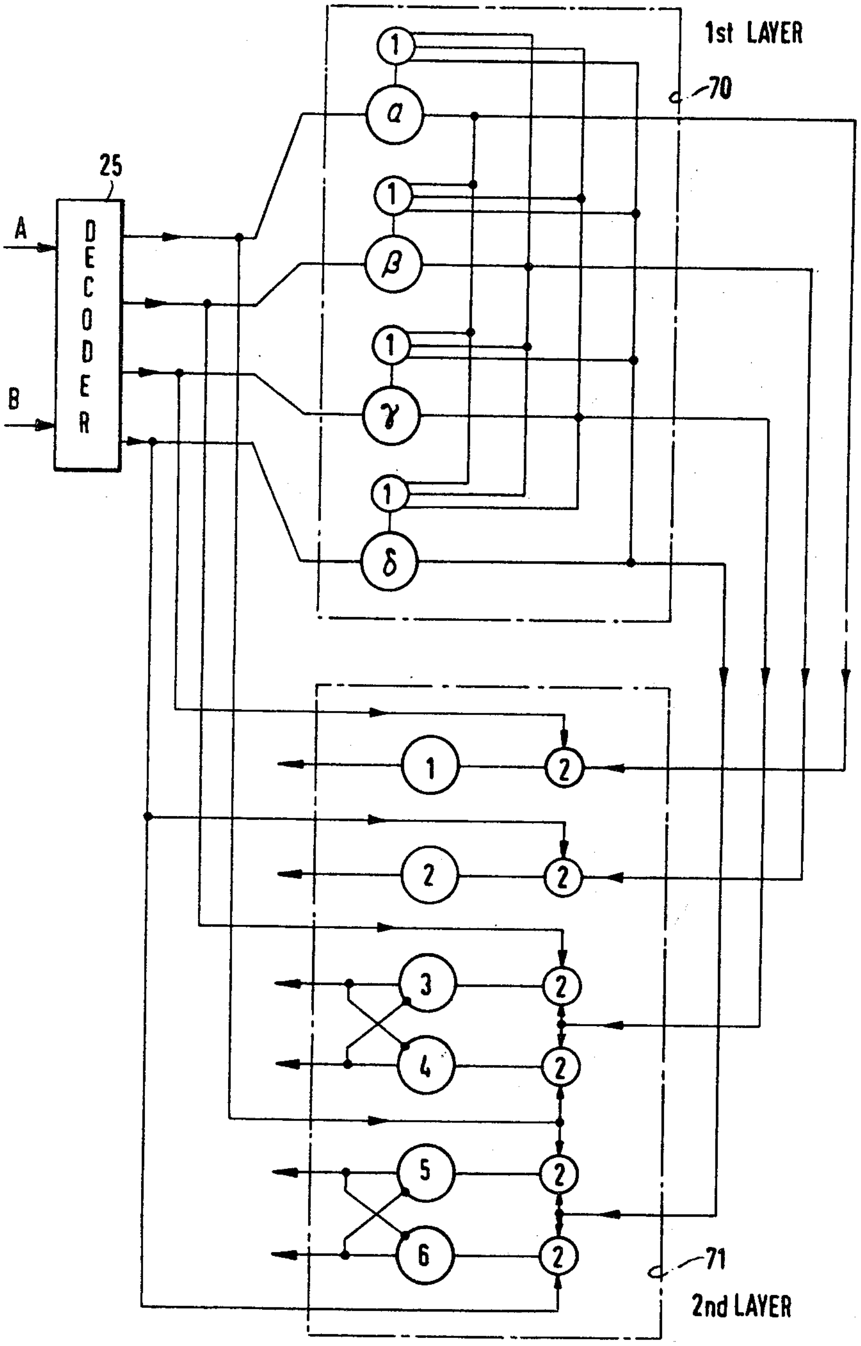
FIG. 6 is a diagram of part of a decision network for use in the system of FIG. 2: in practice, the decoder contains more inputs and outputs and the first and second decision levels of the decision network contain more units.

One particular form of decision network 26 is illustrated in FIG. 6. The decoder 25 in this case has two input criteria A and B (each either +1 or −1) and therefore has four output lines or possibilities, each of which is connected to a trigger $\alpha$, $\beta$, $\gamma$, $\delta$· the four triggers together constituting the first decision level 70 of the decision network. In practice, there are many more than two input criteria and many more than four triggers. Each of the decoder output lines can turn "on" one of three decision levels of triggers but not more than one trigger in each decision level can be turned "on," since they are arranged so that once one trigger in a decision level is "on," all the other triggers in that decision level are inhibited. In addition, no trigger in the second decision level can come "on" until a trigger in the first decision level has been turned "on," and each first decision level trigger allows only some of the second decision level triggers to come "on." The same principles are maintained between the second and third decision levels of triggers. The combination of the three triggers which is finally "on" is characteristic of the original spoken sound. In FIG. 6 the second decision level of triggers 71 comprises six triggers 1, 2, 3, 4, 5, 6 each of which is provided with an output lead to the third decision level of triggers (not shown). More than six triggers are usually used in the second decision level.

In the diagram, in the second decision level, trigger 1 is turned "on" by trigger $\gamma$ provided that trigger $\alpha$ is "on," trigger 2 by $\delta$ if $\beta$ is "on," trigger 3 by $\beta$ if $\gamma$ is "on," trigger 4 by $\alpha$ if $\delta$ is "on," trigger 5 by $\alpha$ if $\delta$ is "on," and trigger 6 by $\delta$ if $\delta$ is "on." Hence the six triggers 1, 2, 3, 4, 5, 6 correspond to the sequences $\alpha\gamma$, $\alpha\delta$, $\gamma\beta$, $\gamma\alpha$, $\delta\alpha$ and $\delta\delta$.

By such means with three decision levels of trigger circuits, a system can be wired to respond to any sequence of any three decoded output signals. In practice however, not all the possible sequences are generally required in order to provide indications characteristic of the speech input waveform.

Figure 7:
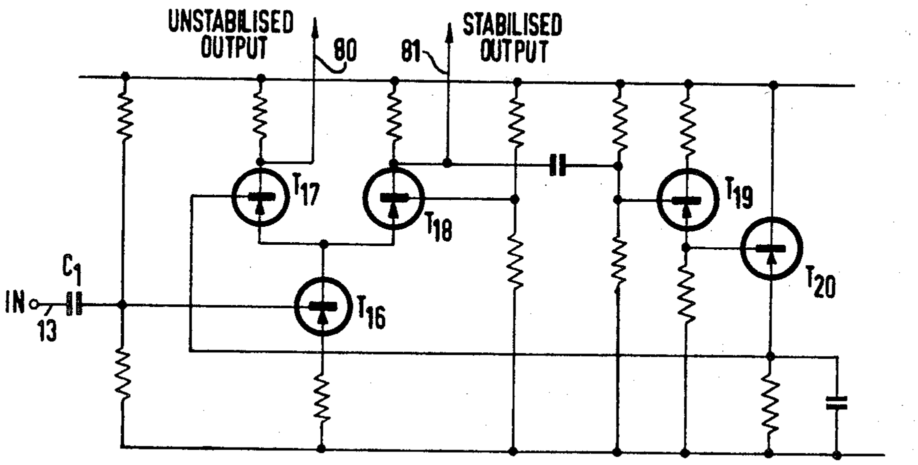
FIG. 7 is a circuit diagram of an automatic volume control for use in the system of FIG. 2.

It is advantageous to insert an automatic volume control 14 (FIG. 2) at some convenient point between the speech source and the detection network. FIG. 7 shows a circuit diagram of one such volume control. The purpose of such a control is to keep the peak amplitude of words at a definite maximum value, but it must also allow the different parts of any particular word to vary in amplitude. Such an automatic volume control is used in order to assist in providing linear performance. The circuit of FIG. 7 essentially comprises five transistors $T_{16}$, $T_{17}$, $T_{18}$, $T_{19}$, $T_{20}$. The input is fed over line 13 through a condenser $C_1$ to the base of a transistor $T_{16}$ is connected directly to the emitters of each transistor $T_{17}$ and $T_{18}$. The current from $T_{16}$ is shared by $T_{17}$ and $T_{18}$.

The current in $T_{16}$ follows the waveform of its input. The current in $T_{16}$ is shared between $T_{17}$ and $T_{18}$, the proportion going to $T_{18}$ depending on the relative bias to the bases of transistors $T_{17}$ and $T_{18}$. The output of $T_{18}$ collector is peak rectified by $T_{19}$. The direct current at the emitter of $T_{19}$ depends on the peak amplitude at $T_{18}$. $T_{20}$ amplifies this direct current and feeds it back to the base of $T_{18}$ in such a way that an increase in peak signal at $T_{18}$ increases the direct current at the emitter of $T_{19}$ which causes $T_{18}$ base bias to move in such a way as to decrease the share of $T_{16}$ current taken by $T_{18}$. The effect of this is to stabilise the peak size of the $T_{18}$ collector signal. The condenser between $T_{18}$ and $T_{19}$, with its associated resistors, determines the time constant of the stabilization. An unstabilised output on lead 80 is obtained from the collector of transistor $T_{17}$. The collector of transistor $T_{18}$ provides a stabilized output on lead 81 since it is biased by further transistors $T_{19}$ and $T_{20}$.

Figure 8:
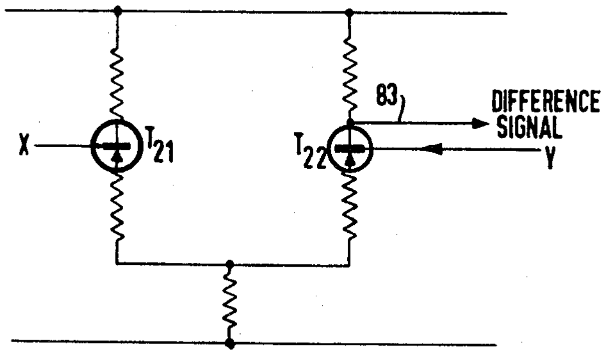
FIG. 8 shows a method of combining two correlated outputs for providing one decoder input.

In the embodiment shown in FIG. 2, all the signals from the correlators 21, 22, 23, 24 to the decision network 26 are individual signals in that each signal comes from a single correlator. In certain cases it is preferable to obtain a decoder input signal by combining the outputs of two correlators as shown in FIG. 8. In this arrangement, signals X, Y from two correlators are fed respectively to the bases of two transistors $T_{21}$, $T_{22}$ which have their emitters coupled together, and the difference signal is taken from the collector of one of the transistors on lead 83. This device is useful, for example, in the recognition of the long "e" sound.

Figure 9:
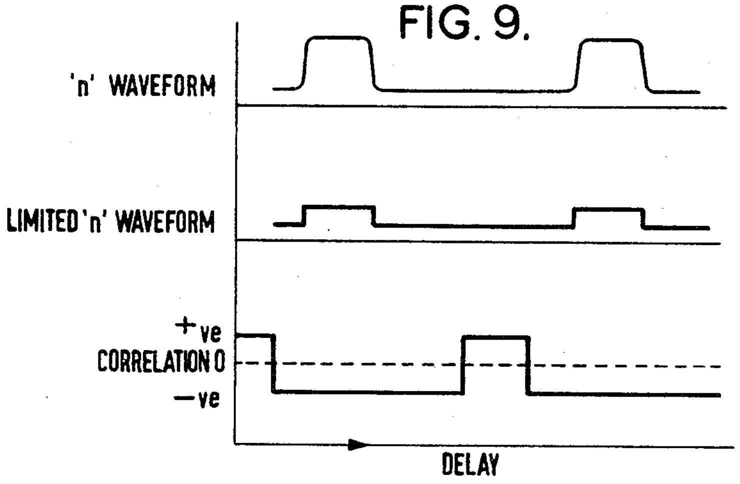
FIG. 9 shows the correlation delay characteristic for the consonant "n".

It has been found that the letter "n" has a special waveform and this leads to a useful method of recognising it. FIG. 9 shows the "n" waveform, the "n" waveform when limited, and the variation of correlation with delay. As can be seen, the correlation is negative over a much wider delay range than half the period of the waveform and this fact can be used in the recognition of this particular consonant.

Discrimination between the consonants "n" and "m" and between voiced and unvoiced consonants is not always convenient using delay line techniques since these are characterised by the presence or absence of larynx frequency. Larynx frequency is characteristically narrow band and therefore appears as an unattenuated correlation function with respect to time, but its frequency also varies widely from person to person.

According to another feature of the invention, a device is provided for detecting any "narrow band" sound of unknown frequency, such as the larynx frequency. If the frequency of the sound being detected is $f$, then signals $(f+f_0)$ and $(f+f_1)$ are generated and the signal with frequency $f$ is correlated with the signals of frequency $(f+f_0)$ and $(f+f_1)$. Then if the first correlate is much larger than the second, the band-width can be shown to lie between the frequencies $f_0$ and $f_1$. By using this method the presence of a noise of unknown frequency but having a band-width lying between the freqeuncies $f_0$ and $f_1$ can be detected. This correlation technique will detect the existence of "voiced" sounds, and can be used in any apparatus in which the detection of a "narrow band" sound of unknown frequency is required.

In practice, it is also found that energy in the low frequencies is much higher than in the high frequencies and because of this it is often convenient to differentiate the speech signals with a very short time constant and then to limit the speech waveforms to predetermined upper and lower amplitude limits.

Although the described embodiment makes use of two separate delay networks, sufficient information for recognising numerals can be obtained using the high frequency delay network alone, and by obtaining criteria from the value of the correlation function for four time differences only. This is because the main information carrying formants for the vowel sounds lie in the frequency range above 1000 c./s.

While a preferred form of the invention has been shown and described, it will be apparent that various modifications and changes may be made therein without departing from the scope of the invention as set forth in the appended claims.

I claim:

1. Apparatus for effecting speech recognition which comprises, in combination, speech signal input terminals for receiving a speech input waveform, filter means for dividing said input waveform into an upper and a lower frequency component, a first delay network arranged to receive said upper frequency component, a second delay network arranged to receive said lower frequency component, at least one first correlator coupled to said first delay network with the at least one correlator arranged to correlate the undelayed upper frequency component of said waveform with at least one delayed output signal taken from time-delayed points of said first delay network, at least one second correlator coupled to said second delay network with the or each correlator arranged to correlate the undelayed lower frequency component of said waveform with one or more delayed output signals taken from time-delayed points of said second delay network, decoding means coupled to each correlator and capable of providing a particular decoded output signal corresponding to the particular combination of correlator output signals present at any given time, and a decision network coupled to receive a series of said decoded output signals and arranged to provide a characteristic indication for particular sequencies of two or more of said decoded output signals which is representative of the original speech input waveform.

2. Apparatus according to claim 1, in which the high frequency delay network covers the frequency range above approximately 1000 cycles per second and the low frequency delay network covers the frequency range below this value.

3. Apparatus for effecting speech recognition which comprises in combination, speech signal input terminals for receiving a speech input waveform, a delay network arranged for connection to said speech signal input terminals, a plurality of correlators coupled to said delay network for correlating the input signal to the delay network with one or more delayed output signals taken from time-delayed points of said network, decoding means coupled to each correlator for providing a particular decoded output signal corresponding to the particular combination of correlator output signals present at any given time, and a decision network for receiving a series of said decoded output signals and for providing a characteristic indication for particular sequences of two or more of said decoded output signals which is representative of the original speech input waveform.

4. Apparatus according to claim 3, in which said delay network consists of a delay line which is effectively tapered to cover a wide frequency range.

5. Apparatus according to claim 3, in which said correlators consist of multipliers which are each arranged to effect multiplication of two relatively delayed signals.

6. Apparatus according to claim 3, in which each of said correlators comprises a device having three connections to its associated delay network and which provides an output signal which is independent of the amplitude of the speech input waveform.

7. Apparatus according to claim 6, in which said device creates a difference signal between a first and second connection point to the delay network and a difference signal between said second connection point and a third connection point, the output from the device being dependent on the integrated product of said two difference signals.

8. Apparatus according to claim 7, in which the delay between said first and second connection points is equal to the delay between said second and third connection points.

9. Apparatus according to claim 6, in which one of said connection points is earthed to provide a device with effectively only two inputs.

10. Apparatus according to claim 3, in which said means for decoding the correlator outputs comprises a diode decoder arranged to provide $2^p$ output possibilities for $p$ input criteria.

11. Apparatus according to claim 3, in which the decision network comprises a hierarchy of decision levels each consisting of a plurality of trigger circuits, the networks being such as to respond to any sequence of any three combinations of the input variables to the network.

12. Apparatus according to claim 3, which includes an automatic volume control circuit between the speech signal input terminals and the decision network for keeping the peak amplitude of the speech input signal at a predetermined maximum value while permitting the different parts of the signal to vary in amplitude.

13. Apparatus according to claim 3, which includes a non-linear filter network between the input terminals and the delay network or networks, said filter having a sharply increasing response over the frequency range of 700 c./s. to 2,000 c./s.

14. Apparatus according to claim 3, in which the output signals from two correlators are combined to provide a difference signal which is fed to the decoding means.

15. Apparatus according to claim 3, which includes means for detecting a narrow band-width sound of unknown frequency $f$, such means comprising means for generating signals $(f+f_0)$ and $(f+f_1)$ and means for correlating the signal of frequency $f$ with the two generated signals to determine which correlate is the larger.

16. A serial aperiodic logic system comprising a hierarchy of decision levels each comprising a plurality of trigger circuits, the trigger circuits in the first of said decision levels being arranged to receive code signals and each being responsive to a different one of said code signals, means for inhibiting the remaining trigger circuits in a given decision level when one trigger circuit in the decision level reacts to a code signal, means for permitting a response of each succeeding decision level to the code signals only when a trigger circuit in the preceding decision level has reacted to a code signal, whereby the combination of trigger circuits which react to said code signals provides a characteristic indication for particular sequences of said code signals.

17. A correlation circuit comprising at least two input terminals for receiving an input electrical signal of variable amplitude, difference circuit means for correlating said input signals and for providing either a first or a second control signal in accordance with the positive or negative sense of said correlation, and integrating means, one of said control signals constituting means for controlling switching of said integrating means into circuit with a first constant energy source and the other of said control signals constituting means for controlling switching of said integrating means into circuit with a second constant energy source, whereby the output signal from said integrating means is independent of the absolute input signal amplitudes.

18. A correlation circuit as claimed in claim 17, comprising at least three input terminals for receiving an input electrical signal of variable amplitude, wherein said difference circuit means correlates the input signals at a first and second of said input terminals to provide a first difference signal and correlates the input signals at said second and a third of said input terminals to provide a second difference signal, said difference signals being compared to provide said first or second control signal, and said energy sources being respectively of positive and negative sense to provide an output signal from said integrating means of positive or negative amplitude.

References Cited

UNITED STATES PATENTS

| | | | |
|---|---|---|---|
| 2,928,901 | 3/1960 | Bogert | 179—1 XR |
| 3,067,291 | 12/1962 | Lewinter | 179—15.55 XR |
| 3,069,507 | 12/1962 | David | 179—1 XR |

KATHLEEN H. CLAFFY, *Primary Examiner.*